('12) United States Patent
Huang (10) Patent No.: US 10,425,658 B2
(45) Date of Patent: Sep. 24, 2019

(54) IMAGE BLOCK-BASED MATCHING METHOD AND SYSTEM, AND VIDEO PROCESSING DEVICE

(71) Applicant: Tencent Technology (Shenzhen) Company Limited, Shenzhen (CN)

(72) Inventor: Jiawen Huang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 81 days.

(21) Appl. No.: 15/709,337

(22) Filed: Sep. 19, 2017

(65) Prior Publication Data

US 2018/0007384 A1 Jan. 4, 2018

Related U.S. Application Data

(63) Continuation-in-part of application No. PCT/CN2016/101073, filed on Sep. 30, 2016.

(30) Foreign Application Priority Data

Oct. 9, 2015 (CN) .......................... 2015 1 0648691

(51) Int. Cl.
*H04N 19/533* (2014.01)
*H04N 19/56* (2014.01)
(Continued)

(52) U.S. Cl.
CPC ......... *H04N 19/533* (2014.11); *H04N 19/192* (2014.11); *H04N 19/56* (2014.11); *H04N 19/57* (2014.11)

(58) Field of Classification Search
None
See application file for complete search history.

(56) References Cited

U.S. PATENT DOCUMENTS

| 2005/0091267 A1* | 4/2005 | Zhang ................ G06K 9/6226 |
| 2006/0203912 A1 | 9/2006 | Kodama |
| 2010/0027900 A1* | 2/2010 | Tetsukawa ............. H04N 19/56 |
| | | 382/236 |

FOREIGN PATENT DOCUMENTS

| CN | 1674679 A | 9/2005 |
| CN | 1787642 A | 6/2006 |
| CN | 102572434 A | 7/2012 |

OTHER PUBLICATIONS

J. Y. Tham, S. Ranaganath, M. Ranaganath, and A. Kassim, "A novel, unrestricted center-biased diamond search algorithm for block motion estimation," IEEE transactions on Circuits and systems for video technology, vol. 8, pp. 369-377, Aug. 1998 (Year: 1998).*

(Continued)

*Primary Examiner* — William C Vaughn, Jr.
*Assistant Examiner* — Stuart D Bennett
(74) *Attorney, Agent, or Firm* — Morgan, Lewis & Bockius LLP (57) ABSTRACT

This application provides an image block matching method performed at a computing device, the method including: obtaining a target image block and an image; identifying a candidate image block within the image and multiple search points in the candidate image block; calculating a plurality of differences between the target image block and the candidate image block, each difference corresponding to a respective search point; choosing, among the plurality of differences, a smallest value and a corresponding smallest-value search point; and when the smallest-value search point is at the center of the target image block, choosing the candidate image block as a match of the target image block.

18 Claims, 3 Drawing Sheets

(51) Int. Cl.
*H04N 19/192* (2014.01)
*H04N 19/57* (2014.01)

(56) References Cited

OTHER PUBLICATIONS

Xu, Likun et al., "The VC + + Realization of Motion Estimation Algorithm on H.263 Video Compression", Microcomputer Applications, vol. 26, No. 5, Sep. 30, 2015, sections 2 and 3.
Tencent Technology, ISRWO, PCT/CN2016/101073, dated Jan. 3, 2017, 7 pgs.
Tencent Technology, IPRP, PCT/CN2016/101073, dated Apr. 10, 2018, 6 pgs.

* cited by examiner

Search range

IMAGE BLOCK-BASED MATCHING METHOD AND SYSTEM, AND VIDEO PROCESSING DEVICE

RELATED APPLICATIONS

This application is a continuation-in-part application of PCT/CN2016/101073, entitled "IMAGE BLOCK-BASED MATCHING METHOD AND SYSTEM, AND VIDEO PROCESSING DEVICE" filed on Sep. 30, 2016, which claims priority to Chinese Patent Application No. 201510648691.0, filed with the State Intellectual Property Office of the People's Republic of China on Oct. 9, 2015, and entitled "IMAGE BLOCK-BASED MATCHING METHOD AND SYSTEM, AND VIDEO PROCESSING DEVICE", both of which are incorporated herein by reference in their entirety.

FIELD OF THE TECHNOLOGY

This application relates to the field of video image processing technologies, and in particular, to an image block-based matching method and system, and a video processing device.

BACKGROUND OF THE DISCLOSURE

As the Internet develops rapidly and the material and spiritual culture of people becomes increasingly rich, in the Internet, there are more and more requirements on applications for videos, especially for high-definition videos. However, a high-definition video has a very large amount of data; if it is intended that the high-definition video can be transmitted in the Internet with limited bandwidth, a problem to be resolved first is a problem of compression and encoding of the high-definition video.

SUMMARY

To overcome the existing defects, this application provides a match search method and system based on an image block, and a video processing device, so as to reduce a calculation amount of block distortion, reduce a memory access time, and improve match search efficiency of an image block.

According to an aspect of this application, an image block matching method is performed at a computing device having one or more processors and memory storing one or more programs to be executed by the one or more processors, the method including the following operations:

obtaining a target image block and an image;

identifying a candidate image block within the image and a search pattern within the candidate image block, the search pattern including a center search point and multiple neighboring search points surrounding the center search point;

calculating a sum of absolute differences between the target image block and the candidate image block at the center search point and a normalized static partial sum of absolute differences between the target image block and the candidate image block at each neighboring search point;

choosing, among the sum of absolute differences between the target image block and the candidate image block at the center search point and the normalized static partial sum of absolute differences between the target image block and the candidate image block at each neighboring search point, a smallest value and a corresponding smallest-value search point; and in accordance with a determination that the smallest-value search point is the center search point, choosing the candidate image block as a match of the target image block.

According to another aspect of this application, a computing device comprises one or more processors, memory and one or more programs stored in the memory, wherein the one or more programs, when executed by the one or more processors, cause the computing device to perform the aforementioned image block matching method.

According to still another aspect of this application, a non-transitory computer readable storage medium, stores a plurality of computer executable instructions, the computer executable instructions being executed by one or more processors of a computing device to perform the aforementioned image block matching method.

To expressly implement the structure of the embodiments of this application, specified sizes, structures and parts are marked in the figure. This is merely used for illustration, and is not intended to limit this application in the specified sizes, structures, parts and conditions. According to specific requirements, persons of ordinary skill in the art may adjust or modify these parts and conditions, and the adjustments or modifications are still included in the scope of the appended claims.

DESCRIPTION OF EMBODIMENTS

The following describes this application in detail with reference to accompanying drawings and specific embodiments.

During video image processing, a data block most matching a target usually needs to be sought out from a search range of a reference image; that is, block matching is performed. An existing image block match search method includes full search; that is, BD (Block Distortion) at each position in the reference search range is calculated, where BD represents a matching degree of two data blocks. Then, a position of the smallest BD is selected as a matching point. A type of frequently-used BD includes SAD (Sum of absolute differences). As a type of frequently-used BD, SAD means that, in a block matching, a total sum of absolute differences of corresponding data points is used to represent a matching degree of two data blocks. A definition of SAD is:

$$SAD(x, y, u, v) = \sum_{i=1}^{M}\sum_{j=1}^{N}|F(x+i, y+j) - F'(x+i+u, y+j+v)|.$$

Wherein F is a target image block, F' is a candidate image block, (x, y) is a coordinate of the target image block in an image, (u, v) is a coordinate corresponding to (x, y) of the candidate image block in another image, and M and N are the width and height of the target image block. A full search algorithm scans outward away from a position (0, 0) to the entire search range, and workload is enormous.

In addition, an existing software encoder usually uses a pattern search algorithm in which various pattern search points are used and BD is calculated, so as to quickly converge to a final position. BD of search points is calculated in a diamond pattern starting from a position (0, 0); then a search point of the smallest BD in the pattern is used as a pattern central point of a next iteration until the search point of the smallest BD is the pattern central point; and finally, a final position is determined by comparing the search point with adjacent search points. Data in search points marked with numbers all needs to be read, such as a diamond search.

Figure 1:
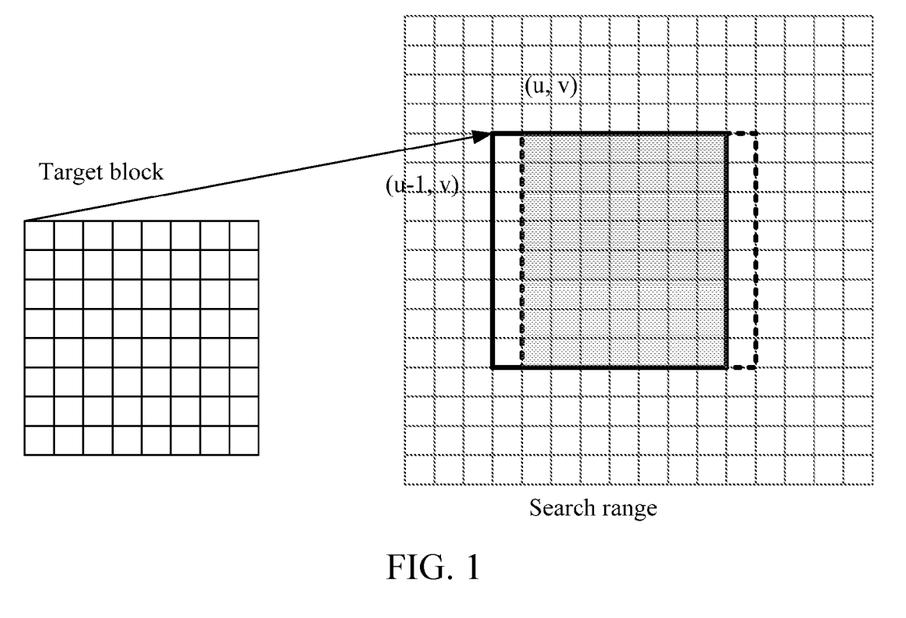
FIG. 1 is a schematic diagram of an image block matching method according to an embodiment of this application.

In addition, referring to FIG. 1, multiplexing data accelerates BD calculation. Because overheads of reading data from a DRAM are large, multiplexing data can greatly reduce the quantity of times of data reading. During data multiplexing, data blocks are usually transmitted to an SRAM or a register, so that the data blocks can be quickly accessed when the data is multiplexed, and only new added data needs to be read from the DRAM. In FIG. 1, after BD of (u, v) is calculated, data in an adjacent column needs to be read if BD of (u−1, v) needs to be calculated; and more data needs to be read each time if the quantity of times of data reading by multiplexing data needs to be reduced. For example, data in nine points may be read each time. However, data reading of a DSP, a VLSI or a CPU has limitations, and it is uncertain that the data reading can match various pattern search algorithms.

Multiplexing data accelerates BD calculation, and usually needs to cooperate with pipeline processing. Therefore, there is not an operation of pattern search of searching for different search points according to conditions. Search has a fixed sequence, and this type of algorithms is usually used for a DSP or a VLSI. It is difficult for this type of algorithms to be applied to software encoding. Software implementation may be performed by using an SIMD instruction of a CPU, for example, a target block has been saved into an A0-A7 register, and when (u, v) is matched, the data has been stored into a B0-B7 register. If data needs to be multiplexed when (u, v+1) is matched, a relatively feasible way is to read more data when (u, v) is read. However, a limitation on the length of data of the SIMD instruction is usually relatively large, and an implementation difficulty is also relatively high.

Multiple different aspects of this application are described in the following description. However, persons of ordinary skill in the art may use only a part or all structures or procedures of this application to implement this application. For purposes of clear explanation, specified quantities, configurations and sequences are described. It will be apparent, however, that this application may be implemented without these specified details. In other cases, well-known features are not described in detail to not obscure this application.

This application provides an image block matching method, and the method includes the following operations: obtaining a target image block and an image, and determining, according to the target image block, a search range within the image; calculating an absolute difference between the target image block and a block of the image at the search point, and calculating a static partial sum of absolute differences between the target image block and a block of the image at an adjacent search point and performing normalization processing on the static partial sum of absolute differences at each adjacent search point to obtain a normalized static partial sum of absolute differences; and determining a search point position having a smallest absolute difference of all the search points and a smallest normalized static partial sum of absolute differences of all the adjacent search points, and choosing a block of the image at the determined search point position as a match of the target image block. In this way, in this application, a match position is determined by comparing a search point with a normalized static partial sum of absolute differences of an adjacent search point through calculation, thereby reducing a calculation amount of block distortion, reducing a memory access time, and improving match search efficiency of an image block.

Referring to FIG. 1, FIG. 1 is a schematic flowchart of an image block matching method according to an embodiment of this application. The image block matching method of this application is performed at a computing device and specifically includes the following operations:

Operation S1: Obtain a target image block and an image, and determine, according to the target image block, a search point of a search range within the image.

In some embodiments, a static position in the target image block is usually determined as the search point, that is, an initial search point. Alternatively, a position obtained by adding the static position in the target image block to a predicted starting point (for example, in a novel encoder such as h.264 or h.265), such as a motion vector of an adjacent block, may be determined as the search point.

In some embodiments, a candidate image block is identified within the image with a search pattern (e.g., diamond search pattern) within the candidate image block, the search pattern including a center search point and multiple neighboring search points surrounding the center search point.

Operation S2: Calculate a sum of absolute differences between the target image block and a block of the image at the search point, and calculate a static partial sum of absolute differences between the target image block and a block of the image at an adjacent search point and perform normalization processing on the static partial sum of absolute differences at each adjacent search point to obtain a normalized static partial sum of absolute differences.

PD (Partial Distortion) is a matching degree of two data blocks, but only a part of data is calculated.

SPSAD (Static Partial Sum of absolute differences) is a type of PD, meaning that, in a block matching, an SAD calculation is performed for adjacent search points by using a part of data points, where only data existing in a current search point is multiplexed.

NSPSAD (Normalized Static Partial Sum of absolute differences) is a type of PD that needs to be normalized because the multiplexed area is affected by the block size and a displacement amplitude before being compared with an SAD.

Operation S3: Determine a search point position having a smallest absolute difference of all the search points and a smallest normalized static partial sum of absolute differences of all the adjacent search points, and choose a block of the image at the determined search point position as a match of the target image block.

In some embodiments, for each search point in the search pattern, a sum of absolute differences between the target image block and the candidate image block at the center search point and a normalized static partial sum of absolute differences between the target image block and the candidate image block at each neighboring search point.

Among the sum of absolute differences between the target image block and the candidate image block at the center search point and the normalized static partial sum of absolute differences between the target image block and the candidate image block at each neighboring search point, a smallest value and a corresponding smallest-value search point are chosen.

If the smallest-value search point is the center search point, then the candidate image block is chosen as a match of the target image block. In some embodiments, the search pattern further includes multiple intermediate search points separating the center search point from the neighboring search points. The computing device then calculates a normalized static partial sum of absolute differences between the target image block and the candidate image block at each intermediate search point and chooses one of the intermediate search points having a smallest normalized static partial sum of absolute differences between the target image block and the candidate image block as the smallest-value search point. Finally, the candidate image block is updated to be centered at the smallest-value search point and chosen as the match of the target image block.

Otherwise, e.g., if the smallest-value search point is one of the multiple neighboring search points, a new candidate image block within the image and a search pattern within the new candidate image block are identified, the search pattern including a new center search point being the smallest-value search point and multiple neighboring search points surrounding the new center search point. Then the computing device repeats the aforementioned calculating, choosing and identifying operations until a candidate image block's smallest-value search point is the candidate image block's center search point.

In some embodiments, the target image block is associated with a search query submitted by a terminal to the computing device, e.g., an image query. The search query may include an image and with a region of the image selected by the user of the terminal as the target image block. In response to the search query, the candidate image block matching the target image block is identified and then marked within the image. The computing device the returns the updated image (e.g., with the candidate image block highlighted) to the terminal as a search result of the search query.

In some embodiments, the image is extracted from a sequence of image frames of a video stream. The computing device applies the aforementioned image block matching method to the sequence of image frames and marks a location of each matching candidate image block within a corresponding image frame, and then plays the video stream with the locations of the candidate image blocks being highlighted within the video stream. Note that this processed video stream may be returned to be displayed at the terminal that submits the original search query.

Figure 2:
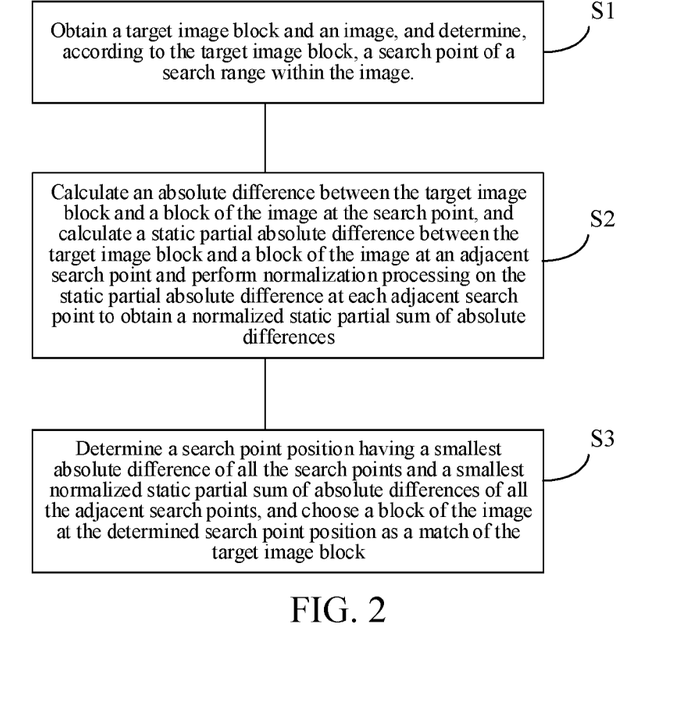
FIG. 2 is a schematic flowchart of an image block matching method according to another embodiment of this application.

As shown in FIG. 2, another embodiment of this application provides an image block matching method, and operation S2 includes:

Operation S201: Calculate the absolute difference between the target image block and a block of the image at the search point, where a calculation formula of the absolute difference is:

$$SAD(x, y, u, v) = \sum_{i=1}^{M} \sum_{j=1}^{N} |F(x+i, y+j) - F'(x+i+u, y+j+v)|.$$

F is the target image block, F' is the candidate image block, (x, y) is a coordinate of the target image block in the image, (u, v) is a coordinate corresponding to (x, y) of the candidate image block in the image, and M and N are the width and height of the target image block.

Operation S202: Calculate the static partial absolute difference at each adjacent search point and perform normalization processing on the static partial sum of absolute differences at each adjacent search point to obtain the normalized static partial sum of absolute differences, where a calculation formula of the static partial absolute difference is:

$$SPSAD(x, y, u, v, s, t) =$$

$$\begin{cases} \sum_{i=1}^{M-|s|} \sum_{j=1}^{N-|t|} |F(x+i, y+j) - F'(x+i+u+s, y+j+v+t)| \\ \text{where } s > 0, t > 0, |s| < M, |t| < N \\ \sum_{i=1}^{M-|s|} \sum_{j=1}^{N-|t|} |F(x+i+s, y+j) - F'(x+i+u, y+j+v+t)| \\ \text{where } s \leq 0, t > 0, |s| < M, |t| < N \\ \sum_{i=1}^{M-|s|} \sum_{j=1}^{N-|t|} |F(x+i, y+j+t) - F'(x+i+u+s, y+j+v)| \\ \text{where } s > 0, t \leq 0, |s| < M, |t| < N \\ \sum_{i=1}^{M-|s|} \sum_{j=1}^{N-|t|} |F(x+i+s, y+j+t) - F'(x+i+u, y+j+v)| \\ \text{where } s \leq 0, t \leq 0, |s| < M, |t| < N \end{cases}$$

F is the target image block, F' is the candidate image block, (x, y) is the coordinate of the target image block in the image, (u, v) is a coordinate corresponding to (x, y) of the candidate image block in the image, and M and N are the width and height of the target image block.

$$NSPSAD(x,y,u,v,s,t)=SPSAD(x,y,u,v,s,t) \times M \times N \div (M-|s|) \div (N-|t|)+K$$

K is a predefined adjustable value (K is an empirical value, and is a result calculated mainly by approximating to an SAD) and (s, t) is the coordinate offset between the target image block and the candidate image block.

In some embodiments, in a process of block matching, when an SAD (x, y, u, v) can be calculated, results of an NSPSAD (x, y, u, v, −(M−1), −(N−1)) to an NSPSAD (x, y, u, v, (M−1), (N−1)) can be also calculated by using the same set of data, provided that an offset is performed on the target block and a data block of a position (u, v).

However, the smaller overlapping range indicates the weaker relevance between an NSPSAD (x, y, u, v, s, t) and an SAD (x, y, u+s, v+t), and a lower accuracy of determining whether a search point can be excluded. Generally, the overlapping area appropriately accounts for more than 50% of the block area.

In addition, in this application, a data multiplexing PD algorithm excluded from the NSPSAD can be designed according to a BD algorithm excluded from the SAD. Alternatively, different pattern search algorithms may be used, not limited to a diamond search.

This application can support variable block size and multi-reference frame search, not limited to the size of 8*8 blocks; and can support multi-reference frame search, not limited to single-reference frame search in examples.

This application can perform sampling on data to further reduce BD calculation. This application can further multiplex data that is not limited to a calculation between a target block and a search block such as BD and PD, and an analysis and calculation of the search block are also included.

Figure 3:
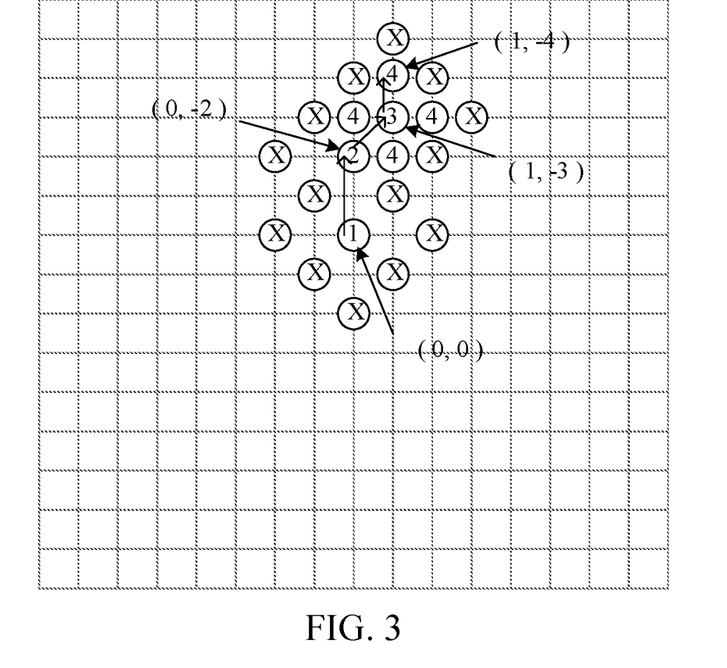
FIG. 3 is a working schematic diagram of an image block matching method according to an embodiment of this application.

FIG. 3 is a working schematic diagram of an image block matching method according to some embodiments of the present application. As shown in the FIG. 3, the search process includes the following operations:

First operation: Calculate a search point marked as (1), and find out that BD of (0, −2) is the smallest.

Second operation: Use (0, −2) as a central point of a diamond pattern, calculate a search point marked as 2, and find out that BD of (1, −3) is the smallest.

Third operation: Use (1, −3) as a central point of the diamond pattern, calculate a search point marked as 3, and find out that BD of (1, −3) is the smallest.

Fourth operation: Calculate a search point adjacent to (1, −3) and marked as 4, find out that BD of (1, −4) is the smallest, and finally select (1, −4) as a match position.

Figure 4:
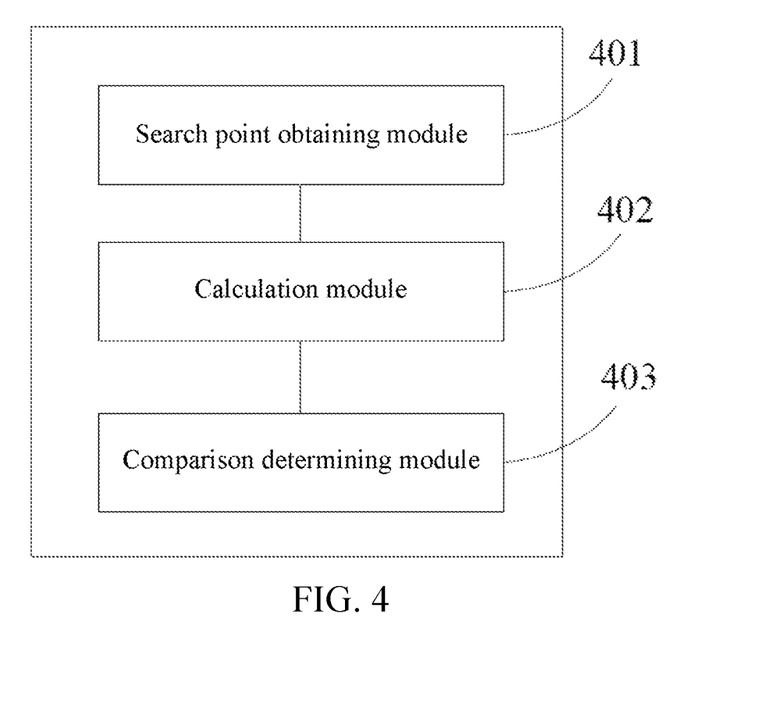
FIG. 4 is a partial schematic flowchart of a match search system based on an image block according to an embodiment of this application.

As shown in FIG. 4, another embodiment of this application provides a match search system based on an image block, including:

a search point obtaining module 401, configured to obtain a target image block, and determine, according to the target image block, a search point of a search range within the image;

a calculation module 402, configured to calculate an absolute difference between the target image block and a block of the image at the search point, and calculate a static partial sum of absolute differences between the target image block and a block of the image at an adjacent search point and perform normalization processing on the static partial sum of absolute differences at each adjacent search point to obtain a normalized static partial sum of absolute differences; and a comparison determining module 403, configured to determine a search point position having a smallest absolute difference of all the search points and a smallest normalized static partial sum of absolute differences of all the adjacent search points, and use the smallest search point position as a match position.

In addition, another embodiment of this application further provides a video processing device, including the match search system based on an image block according to the foregoing embodiment.

Compared with the existing technologies, a match search method and system based on an image block, and a video processing device of this application reduce a calculation amount of block distortion, reduce a memory access time, and improve match search efficiency of an image block.

Figure 5:
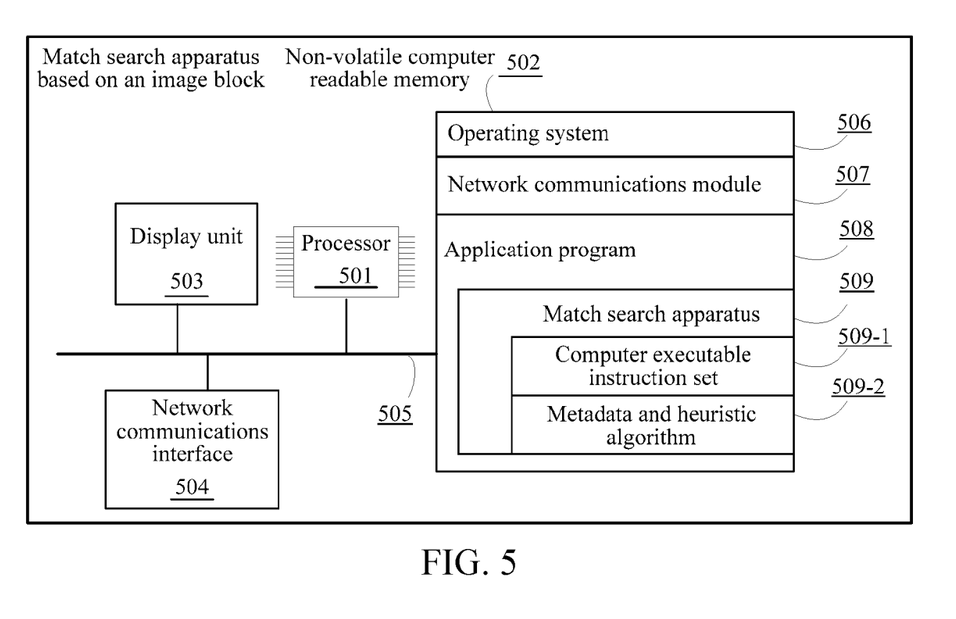
FIG. 5 is a schematic structural diagram of a match search apparatus based on an image block according to an embodiment of this application.

FIG. 5 is a schematic structural diagram of a computing device performing an image block matching method according to some embodiments of the present application. As shown in FIG. 5, the computing device may include: a processor 501, a non-transitory computer readable storage medium 502, a display unit 503, and a network communications interface 504. These components perform communication through a bus 505.

In this embodiment, the non-transitory computer readable storage medium 502 stores multiple program modules, including an operating system 506 that includes procedures for handling various basic system services and for performing hardware dependent tasks, a network communications module 507 for connecting the computer server to other computers (e.g., the terminal devices) via the one or more communication network interfaces (wired or wireless) and one or more communication networks, such as the Internet, other wide area networks, local area networks, metropolitan area networks, and so on, and an application program 508.

The processor 501 may read various modules (not shown in the figure) included in the application program in the non-transitory computer readable storage medium 502 to perform various function applications and data processing of the match search apparatus based on an image block. The processor 501 in this embodiment may be one or more, and may be a CPU, a processing unit/module, an ASIC, a logical module, a programmable gate array, or the like.

The operating system 506 may be: a Windows operating system, an Android operating system or an iPhone OS operating system.

The application program 508 may include: a match search apparatus 509. The match search apparatus 509 may include a computer executable instruction set 509-1 formed by each functional module in the apparatus shown in FIG. 4 and a corresponding metadata and heuristic algorithm 509-2. These computer executable instruction sets may be executed by the processor 501 to complete the method shown in FIG. 2 or the functions of the apparatus shown in FIG. 4.

In this embodiment, the network communications interface 504 cooperates with the network communications module 507 to complete receiving and sending of various network signals of the match search apparatus, for example, sending a data obtaining request to a web server and receiving data from the web server.

The display unit 503 has a display panel, configured to complete input and display of relevant information.

In addition, functional modules in the embodiments of the present application may be integrated into one processing unit, or each of the modules may exist alone physically, or two or more modules may be integrated into one unit. The integrated unit may be implemented in a form of hardware, or may be implemented in a form of a software functional unit. The functional modules in the embodiments may be located on one terminal or network node, or may be distributed on multiple terminals or network nodes.

In addition, each embodiment of the present application may be implemented by a data processing program executed by a data processing device such as a computer. Apparently, the data processing program constitutes the present disclosure. In addition, generally, a data processing program stored in a storage medium is directly read from the storage medium for execution or the program is installed on or replicated to a storage device (such as a hard disk or memory) of a data processing device for execution. Therefore, such a storage medium also constitutes the present disclosure. The storage medium may use any type of recording manner, such as a paper storage medium (such as a paper tape), a magnetic storage medium (such as a soft disk, a hard disk, or a flash memory), an optical storage medium (such as a CD-ROM), or a magneto-optical storage medium (such as an MO).

Therefore, the present disclosure further provides a storage medium, which stores a data processing program. The data processing program is used for executing any embodiment of the foregoing method of the present disclosure.

A person of ordinary skill in the art may understand that all or some of the operations of the embodiments may be implemented by hardware or a program instructing related hardware. The program may be stored in a computer readable storage medium. The storage medium may include: a read-only memory, a magnetic disk, or an optical disc.

Finally, it should be noted that the foregoing embodiments are merely intended for describing the technical solutions of this application, but are not intended to limit the technical solutions. In application, this application may be extended into other modifications, changes, application and embodiments. Therefore, it is considered that all these modifications, changes, application and embodiments fall within the spirit and teaching scope of this application.

What is claimed is:

1. An image block matching method performed at a computing device having one or more processors and memory storing one or more programs to be executed by the one or more processors, comprising:
   obtaining a target image block and an image;
   identifying a candidate image block within the image and a search pattern within the candidate image block, the search pattern including a center search point and multiple neighboring search points surrounding the center search point;
   calculating a sum of absolute differences between the target image block and the candidate image block at the center search point and a normalized static partial sum of absolute differences between the target image block and the candidate image block at each neighboring search point, wherein the static partial sum of absolute differences between the target image block and the candidate image block is:

$$SPSAD(x, y, u, v, s, t) =$$

$$\begin{cases} \sum_{i=1}^{M-|s|}\sum_{j=1}^{N-|t|} |F(x+i, y+j) - F'(x+i+u+s, y+j+v+t)| \\ \quad \text{where } s > 0, t > 0, |s| < M, |t| < N \\ \sum_{i=1}^{M-|s|}\sum_{j=1}^{N-|t|} |F(x+i+s, y+j) - F'(x+i+u, y+j+v+t)| \\ \quad \text{where } s \leq 0, t > 0, |s| < M, |t| < N \\ \sum_{i=1}^{M-|s|}\sum_{j=1}^{N-|t|} |F(x+i, y+j+t) - F'(x+i+u+s, y+j+v)| \\ \quad \text{where } s > 0, t \leq 0, |s| < M, |t| < N \\ \sum_{i=1}^{M-|s|}\sum_{j=1}^{N-|t|} |F(x+i+s, y+j+t) - F'(x+i+u, y+j+v)| \\ \quad \text{where } s \leq 0, t \leq 0, |s| < M, |t| < N \end{cases}$$

wherein
   F is the target image block, F' is the candidate image block, (x, y) is the coordinate of the target image block in the image, (u, v) is a coordinate corresponding to (x, y) of the candidate image block in the image, (s, t) is a coordinate offset between the target image block and the candidate image block; and M and N are the width and height of the target image block;
   choosing, among the sum of absolute differences between the target image block and the candidate image block at the center search point and the normalized static partial sum of absolute differences between the target image block and the candidate image block at each neighboring search point, a smallest value and a corresponding smallest-value search point; and
   in accordance with a determination that the smallest-value search point is the center search point, choosing the candidate image block as a match of the target image block.

2. The image block matching method according to claim 1, wherein the target image block is associated with a search query submitted by a terminal and the method further comprises:
   updating the image by marking a location of the candidate image block in the image; and
   returning the updated image to the terminal as a search result of the search query.

3. The image block matching method according to claim 1, wherein the image is extracted from a sequence of image frames of a video stream and the method further comprises:
   applying the aforementioned operations to the sequence of image frames in the video stream;
   marking a location of each candidate image block within a corresponding image frame; and
   playing the video stream and highlighting the locations of the candidate image blocks within the video stream.

4. The image block matching method according to claim 1, wherein the search pattern further includes multiple intermediate search points separating the center search point from the neighboring search points and the operation of choosing the candidate image block as a match of the target image block further comprises:
   calculating a normalized static partial sum of absolute differences between the target image block and the candidate image block at each intermediate search point;
   choosing one of the intermediate search points having a smallest normalized static partial sum of absolute differences between the target image block and the candidate image block as the smallest-value search point;
   updating the candidate image block to be centered at the smallest-value search point; and
   choosing the updated candidate image block as the match of the target image block.

5. The image block matching method according to claim 1, further comprising:
   in accordance with a determination that the smallest-value search point is one of the multiple neighboring search points:
      identifying a new candidate image block within the image and a search pattern within the new candidate image block, the search pattern including a new center search point being the smallest-value search point and multiple neighboring search points surrounding the new center search point; and
      repeating the calculating, choosing and identifying operations until a candidate image block's smallest-value search point is the candidate image block's center search point.

6. The image block matching method according to claim 1, wherein the sum of absolute differences between the target image block and the candidate image block at the center search point is:

$$SAD(x, y, u, v) = \sum_{i=1}^{M}\sum_{j=1}^{N} |F(x+i, y+j) - F'(x+i+u, y+j+v)|,$$

wherein
   F is the target image block, F' is the candidate image block, (x, y) is a coordinate of the target image block in the image, (u, v) is a coordinate corresponding to (x, y) of the candidate image block in the image, and M and N are the width and height of the target image block.

7. The image block matching method according to claim 1, wherein the normalized static partial sum of absolute differences between the target image block and the candidate image block is:

$$NSPSAD(x,y,u,v,s,t)=SPSAD(x,y,u,v,s,t)\times M\times N\div(M-|s|)\div(N-|t|)+K,$$

wherein

K is a predefined adjustable value.

8. A computing device, comprising:
one or more processors;
memory; and
one or more programs stored in the memory, wherein the one or more programs, when executed by the one or more processors, cause the computing device to perform a plurality of operations including:
obtaining a target image block and an image;
identifying a candidate image block within the image and a search pattern within the candidate image block, the search pattern including a center search point and multiple neighboring search points surrounding the center search point;
calculating a sum of absolute differences between the target image block and the candidate image block at the center search point and a normalized static partial sum of absolute differences between the target image block and the candidate image block at each neighboring search point, wherein the static partial sum of absolute differences between the target image block and the candidate image block is:

$$SPSAD(x, y, u, v, s, t) = \begin{cases} \sum_{i=1}^{M-|s|}\sum_{j=1}^{N-|t|} |F(x+i, y+j) - F'(x+i+u+s, y+j+v+t)| \\ \text{where } s > 0, t > 0, |s| < M, |t| < N \\ \sum_{i=1}^{M-|s|}\sum_{j=1}^{N-|t|} |F(x+i+s, y+j) - F'(x+i+u, y+j+v+t)| \\ \text{where } s \leq 0, t > 0, |s| < M, |t| < N \\ \sum_{i=1}^{M-|s|}\sum_{j=1}^{N-|t|} |F(x+i, y+j+t) - F'(x+i+u+s, y+j+v)| \\ \text{where } s > 0, t \leq 0, |s| < M, |t| < N \\ \sum_{i=1}^{M-|s|}\sum_{j=1}^{N-|t|} |F(x+i+s, y+j+t) - F'(x+i+u, y+j+v)| \\ \text{where } s \leq 0, t \leq 0, |s| < M, |t| < N \end{cases},$$

wherein
F is the target image block, F' is the candidate image block, (x, y) is the coordinate of the target image block in the image, (u, v) is a coordinate corresponding to (x, y) of the candidate image block in the image, (s, t) is a coordinate offset between the target image block and the candidate image block, and M and N are the width and height of the target image block;
choosing, among the sum of absolute differences between the target image block and the candidate image block at the center search point and the normalized static partial sum of absolute differences between the target image block and the candidate image block at each neighboring search point, a smallest value and a corresponding smallest-value search point; and
in accordance with a determination that the smallest-value search point is the center search point, choosing the candidate image block as a match of the target image block.

9. The computing device according to claim 8, wherein the target image block is associated with a search query submitted by a terminal and the plurality of operations further comprise:
updating the image by marking a location of the candidate image block in the image; and
returning the updated image to the terminal as a search result of the search query.

10. The computing device according to claim 8, wherein the image is extracted from a sequence of image frames of a video stream and the plurality of operations further comprise:
applying the aforementioned operations to the sequence of image frames in the video stream;
marking a location of each candidate image block within a corresponding image frame; and
playing the video stream and highlighting the locations of the candidate image blocks within the video stream.

11. The computing device according to claim 8, wherein the search pattern further includes multiple intermediate search points separating the center search point from the neighboring search points and the operation of choosing the candidate image block as a match of the target image block further comprises:
calculating a normalized static partial sum of absolute differences between the target image block and the candidate image block at each intermediate search point;
choosing one of the intermediate search points having a smallest normalized static partial sum of absolute differences between the target image block and the candidate image block as the smallest-value search point;
updating the candidate image block to be centered at the smallest-value search point; and
choosing the updated candidate image block as the match of the target image block.

12. The computing device according to claim 8, wherein the plurality of operations further comprises:
in accordance with a determination that the smallest-value search point is one of the multiple neighboring search points:
identifying a new candidate image block within the image and a search pattern within the new candidate image block, the search pattern including a new center search point being the smallest-value search point and multiple neighboring search points surrounding the new center search point; and
repeating the calculating, choosing and identifying operations until a candidate image block's smallest-value search point is the candidate image block's center search point.

13. The computing device according to claim 8, wherein the sum of absolute differences between the target image block and the candidate image block at the center search point is:

$$SAD(x, y, u, v) = \sum_{i=1}^{M}\sum_{j=1}^{N} |F(x+i, y+j) - F'(x+i+u, y+j+v)|,$$

wherein

F is the target image block, F' is the candidate image block, (x, y) is a coordinate of the target image block in the image, (u, v) is a coordinate corresponding to (x, y) of the candidate image block in the image, and M and N are the width and height of the target image block.

14. The computing device according to claim 8, wherein the normalized static partial sum of absolute differences between the target image block and the candidate image block is:

NSPSAD(x,y,u,v,s,t)=SPSAD(x,y,u,v,s,t)×M×N÷(M−|s|)÷(N−|t|)+K, wherein K is a predefined adjustable value.

15. A non-transitory computer readable storage medium, storing a plurality of computer executable instructions, the computer executable instructions being executed by one or more processors of a computing device to perform a plurality of operations including:

obtaining a target image block and an image;

identifying a candidate image block within the image and a search pattern within the candidate image block, the search pattern including a center search point and multiple neighboring search points surrounding the center search point;

calculating a sum of absolute differences between the target image block and the candidate image block at the center search point and a normalized static partial sum of absolute differences between the target image block and the candidate image block at each neighboring search point, wherein the static partial sum of absolute differences between the target image block and the candidate image block is:

$$SPSAD(x, y, u, v, s, t) = \begin{cases} \sum_{i=1}^{M-|s|} \sum_{j=1}^{N-|t|} |F(x+i, y+j) - F'(x+i+u+s, y+j+v+t)| \\ \quad \text{where } s > 0, t > 0, |s| < M, |t| < N \\ \sum_{i=1}^{M-|s|} \sum_{j=1}^{N-|t|} |F(x+i+s, y+j) - F'(x+i+u, y+j+v+t)| \\ \quad \text{where } s \le 0, t > 0, |s| < M, |t| < N \\ \sum_{i=1}^{M-|s|} \sum_{j=1}^{N-|t|} |F(x+i, y+j+t) - F'(x+i+u+s, y+j+v)| \\ \quad \text{where } s > 0, t \le 0, |s| < M, |t| < N \\ \sum_{i=1}^{M-|s|} \sum_{j=1}^{N-|t|} |F(x+i+s, y+j+t) - F'(x+i+u, y+j+v)| \\ \quad \text{where } s \le 0, t \le 0, |s| < M, |t| < N \end{cases}$$

wherein

F is the target image block, F' is the candidate image block, (x, y) is the coordinate of the target image block in the image, (u, v) is a coordinate corresponding to (x, y) of the candidate image block in the image, (s, t) is a coordinate offset between the target image block and the candidate image block; and M and N are the width and height of the target image block;

choosing, among the sum of absolute differences between the target image block and the candidate image block at the center search point and the normalized static partial sum of absolute differences between the target image block and the candidate image block at each neighboring search point, a smallest value and a corresponding smallest-value search point; and in accordance with a determination that the smallest-value search point is the center search point, choosing the candidate image block as a match of the target image block.

16. The non-transitory computer readable storage medium according to claim 15, wherein the target image block is associated with a search query submitted by a terminal and the plurality of operations further comprise:

updating the image by marking a location of the candidate image block in the image; and returning the updated image to the terminal as a search result of the search query.

17. The non-transitory computer readable storage medium according to claim 15, wherein the image is extracted from a sequence of image frames of a video stream and the plurality of operations further comprise:

applying the aforementioned operations to the sequence of image frames in the video stream;

marking a location of each candidate image block within a corresponding image frame; and playing the video stream and highlighting the locations of the candidate image blocks within the video stream.

18. The non-transitory computer readable storage medium according to claim 15, wherein the search pattern further includes multiple intermediate search points separating the center search point from the neighboring search points and the operation of choosing the candidate image block as a match of the target image block further comprises:

calculating a normalized static partial sum of absolute differences between the target image block and the candidate image block at each intermediate search point;

choosing one of the intermediate search points having a smallest normalized static partial sum of absolute differences between the target image block and the candidate image block as the smallest-value search point;

updating the candidate image block to be centered at the smallest-value search point; and choosing the updated candidate image block as the match of the target image block.

* * * * *